April 17, 1928.

C. N. WOOD ET AL 1,666,636

BEET TOPPER

Filed Oct. 30. 1926

INVENTORS
*C.N.Wood - W.E.Wood*
BY
ATTORNEY

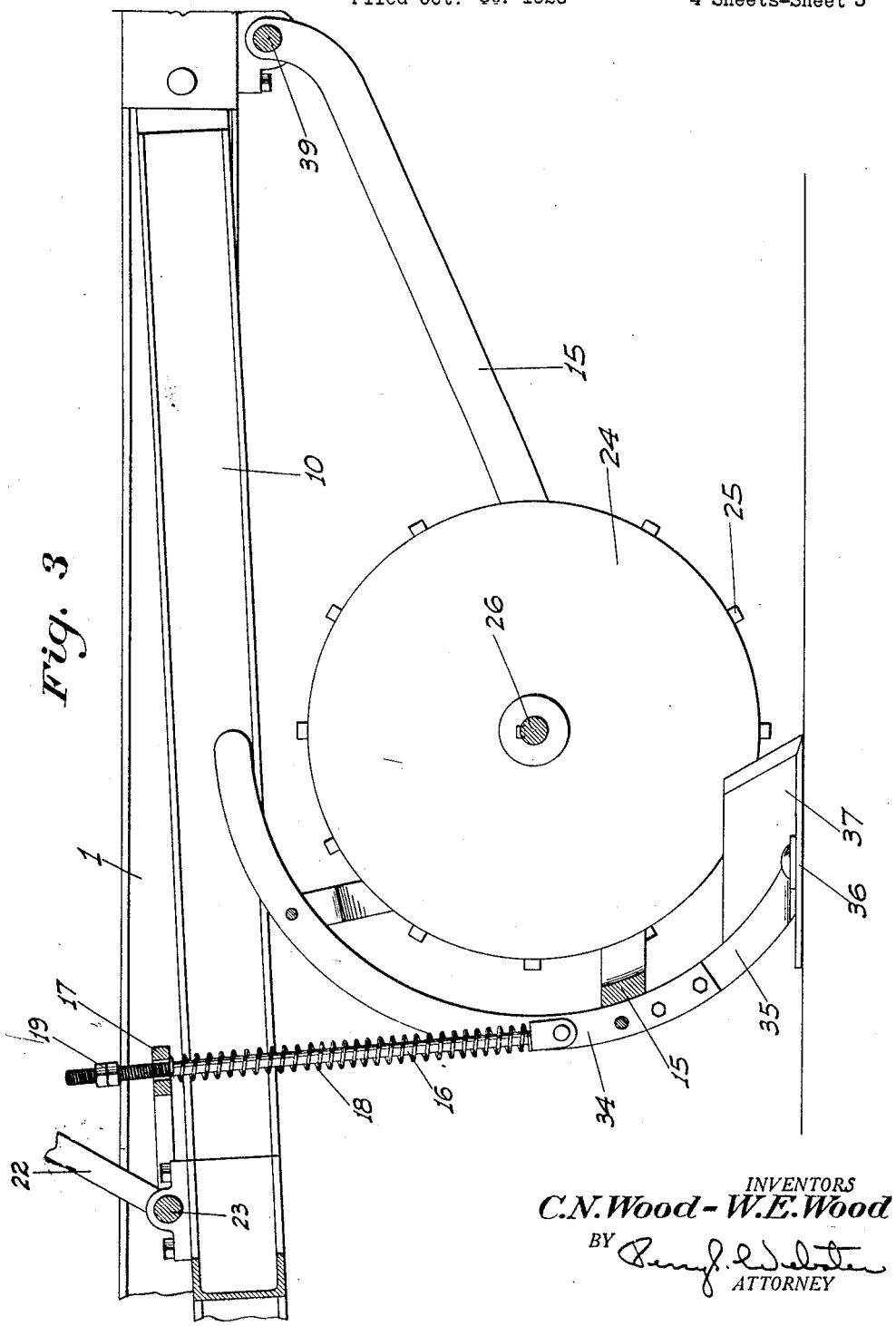

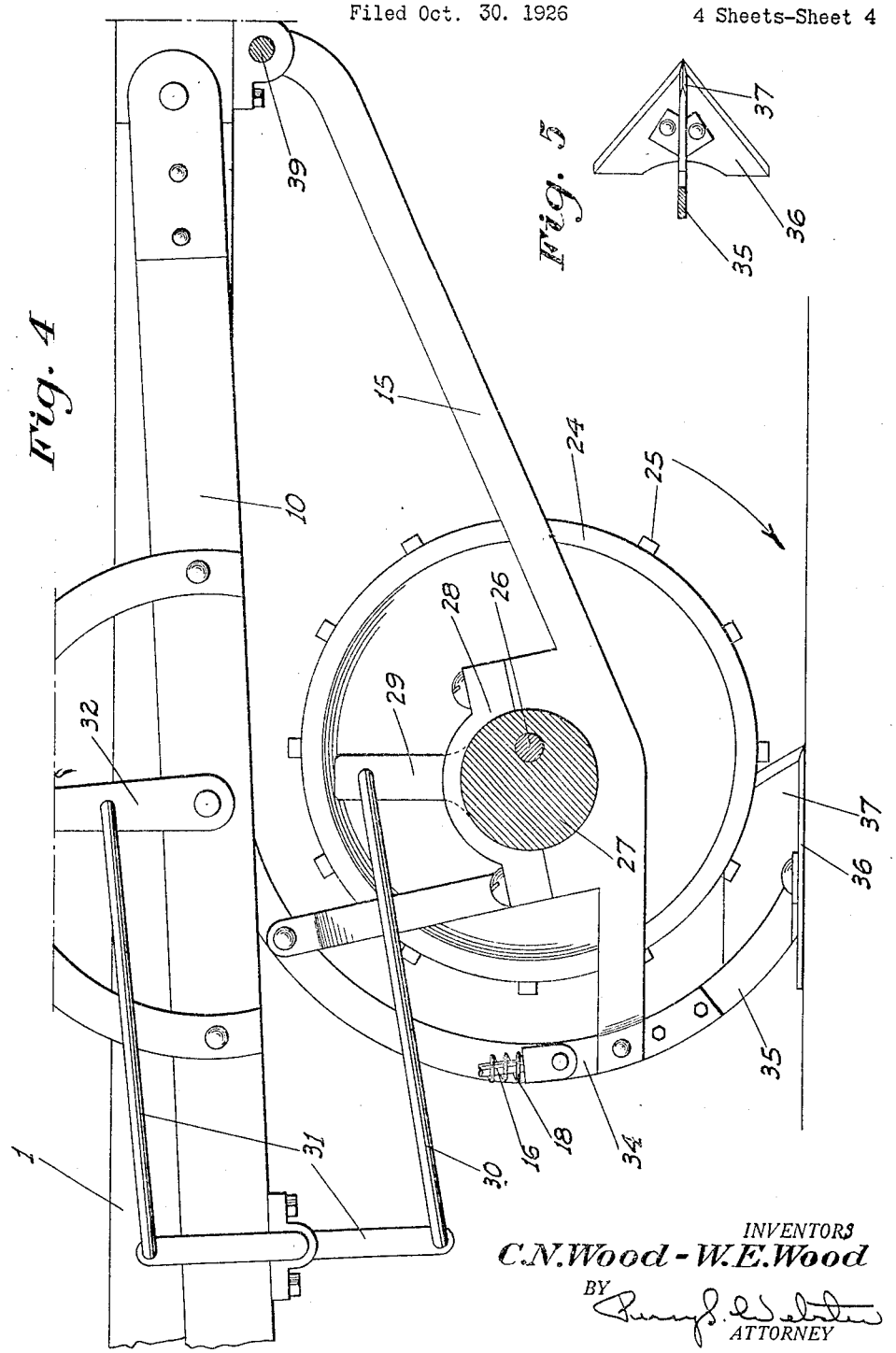

Patented Apr. 17, 1928.

1,666,636

UNITED STATES PATENT OFFICE.

CHARLES N. WOOD AND WILLIAM E. WOOD, OF SACRAMENTO, CALIFORNIA.

BEET TOPPER.

Application filed October 30, 1926. Serial No. 145,223.

This invention relates to improvements in devices for cutting the tops from sugar beets, our principal object being to provide a device for the purpose by means of which the beets are topped before being uprooted from the ground, so that the tops are left on the ground; and the beets when dug are in condition to be then operated on for sugar extraction.

In cutting the tops from the beets it is imperative not only that the leaves themselves should be cut off but that the fibrous top pulp of the beet, from which the leaves sprout, shall also be cut off from the sugar containing meat of the beet. At the same time it is even more essential that such meat shall not be cut into, since this causes the beet to bleed and lose a considerable portion of its sugar containing juice. This operation is at present mainly done by hand, which of course is a slow and inefficient method of procedure.

Another and very important object of our invention therefore is to provide automatically operating means for enabling the beets to be topped while in the ground in such a manner that said beets will be cut through to a depth equal to that of the top pulp and regardless of whether the various beets in a row being acted on project different distances from the ground, as is usually the case.

Different stands of beets frequently have different thicknesses of top pulp, and a further object of our invention is to provide a means for enabling adjustments to be quickly and easily made so that the topping mechanism will always cut to the desired depth, regardless of what this depth may be.

A further object of the invention is to provide means for preventing the leaves and top pulp after being cut from becoming tangled in the mechanism and from being carried upwardly along with the beets as they are dug up.

These objects we accomplish by means of such structure and relative arrangement of parts as will fully appear by a perusal of the following specification and claims.

In the drawings similar characters of reference indicate corresponding parts in the several views:

Fig. 3 is an enlarged longitudinal section of the topping unit.

Fig. 4 is an enlarged side elevation of the topping unit to show the means for adjusting the setting of the beet-riding drum relative to the top cutter.

Fig. 5 is a top plan view of the top cutter detached.

Figure 1:
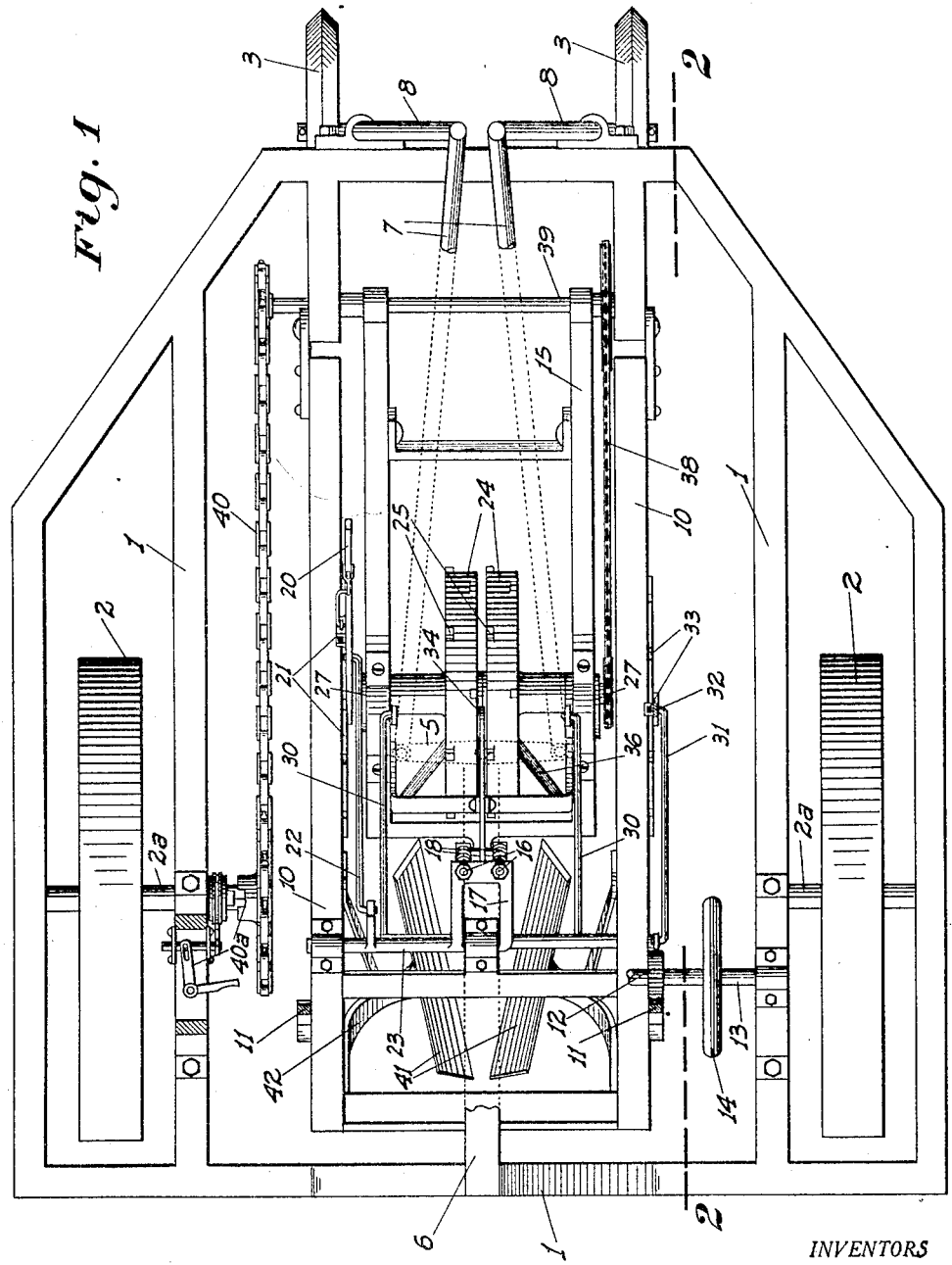
Fig. 1 is a top plan view of our improved beet topper with certain features cut away.
Figure 2:
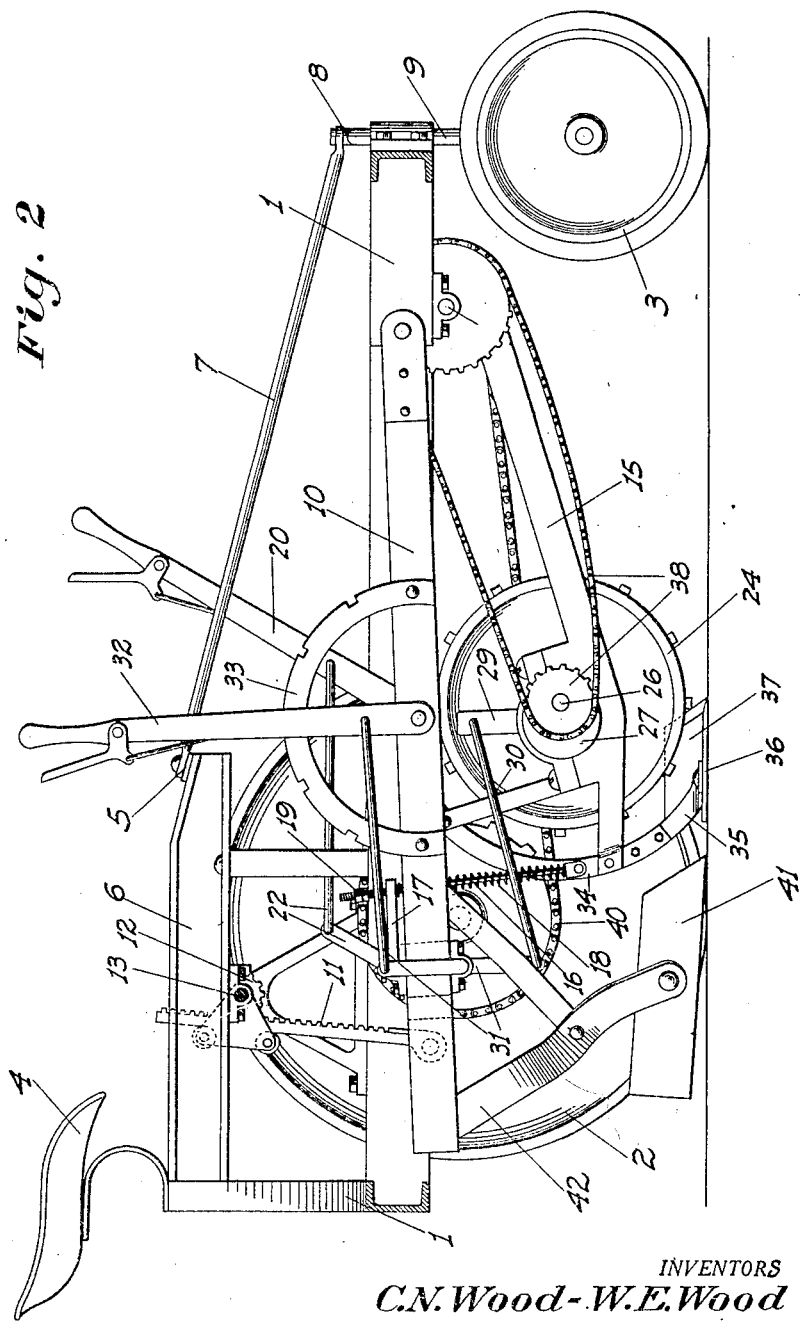
Fig. 2 is a longitudinal side section on the line 2—2 of Fig. 1.

Referring now more particularly to the characters of reference on the drawings, the numeral 1 denotes the main horizontal frame structure of the machine of suitable character which is supported adjacent its rear end and by main wheels 2 journaled on individual stub shafts $2^a$; and at its front end by steerable wheels 3. The latter wheels are steered by the operator occupying the seat 4 mounted on the back of the frame 1, by means of a transverse foot bar 5 pivoted on the forward end of an upper frame member 6 which extends forwardly a certain distance from the rear end of the main frame. From the ends of this foot bar operating rods 7 extend forwardly to connections with radial arms 8 which project laterally in opposite directions from the upper ends of the front wheel spindles 9.

Pivoted onto the frame 1 adjacent its forward end and extending rearwardly thence is an auxiliary frame 10. This frame is adjustably supported adjacent its rear end by vertical rack bars engaged by pinions 12. These pinions are mounted on a shaft 13 supported from the main frame 1, which shaft is rotated by means of a hand wheel 14 or the like.

Independently pivoted onto the main frame 1 inwardly of the frame 10 adjacent the pivotal connection of said frame 10 with the main frame is another auxiliary frame 15, projecting rearwardly and downwardly from its pivotal connection. This frame is supported at its rear end from the frame 10 by vertical rods 16 which are slidable through a plate member 17. Compression springs 18 on the rods under the plate tend to lower the frame 15, this movement being limited by adjustable nuts 19 on top of the rods above said plate. The plate is held at any desired position, so as to increase or slacken the pressure on the springs by means of a lever 20 mounted on the frame 10 and arranged in connection with an ordinary pawl and quadrant holding mechanism indicated at 21. Connecting means 22 extends from said lever to a transverse shaft 23 journaled on the frame 10 and from which the plate 17 projects rearwardly and forwardly.

Mounted in the frame 15 adjacent its rear end is a drum comprising two transversely spaced circular members 24 having transverse and staggered grousers 25 thereon. These members are fixed in common on a shaft 26 journaled in eccentric bearing discs 27. These discs in turn are journaled in boxes 28 mounted on the frame 15. Projecting upwardly from the discs and secured thereto are arms 29 to which are connected rearwardly extending rods 30. The rear ends of these rods are connected by suitable linkage mechanism 31 mounted on the frame 10 to a control lever 32 also mounted on said frame and provided with a holding pawl and quadrant mechanism indicated at 33. By means of this arrangement it will be seen that upon moving the lever one way or the other the eccentric bearing discs will be rotated, and the shaft 26 and the drum will be raised or lowered to the frame 15. The levers 20 and 33 and the hand wheel 14 are located so as to be within convenient reach of the operator occupying the seat 4.

Fixed on the frame 15 to the rear of the drum and concentrically and centrally disposed relative thereto is a bar 34, which extends upwardly to about the top of the drum and also below said frame 15 for a certain distance. On the lower end of this bar is removably attached the supporting arm 35 of a flat transverse cutter 36. This cutter is triangular in form with its apex upwardly and centrally disposed between the drum members, said apex being also located substantially in vertical alinement with the axis of the drum. Projecting upwardly from the cutter centrally thereof and extending into the space between the drum members is a vertical cutting blade 37. The front edge of this blade is sharpened and projects at an upward and rearward angle from the apex of the horizontal cutter, said vertical cutter extending thence to a connection with the arm 35. The blade 36 is disposed so as to lie below the bottom of the drum a distance substantially equal to the thickness of the top pulp of a beet. The bar 34 being rigid on the frame 15 and the drum being adjustable relative to said frame as above described, it will be evident that upon adjusting the drum the distance between the bottom of the drum and the cutter 36 will be altered.

The drum is driven in a forward direction or the same as the rotation of the wheels 2 by means of a chain drive structure 38 between the shaft 26 and the shaft 39 on which the frame 15 is pivoted; and another chain drive 40 between said shaft 39 and the shaft $2^a$ of one of the wheels 2.

In operation the machine being moved forwardly by any suitable draft means, the cutter 36 rides on the ground, being pressed down not only by the weight of the frame 15 and parts thereon, but by the action of the springs 18 whose tension as previously described may be adjusted to suit different conditions, as may be found necessary. With the rotation of the wheels 2 the drum is also rotated and as a beet is reached the drum will climb onto the top of the beet, raising the cutter 36 off of the ground before the latter reaches the beet to cut the same. With a further forward movement of the machine the cutter 36 slices transversely through the top pulp to the necessary depth, which is determined by the distance between the drum and the cutter, and which may be altered according to the formation of different beets in the manner above set forth.

While the cutter 36 is cutting the top horizontally the vertical cutter 37 is slicing the cut top longitudinally, so that by the time the arm 35 is reached, said top is in two separated sections and will be deflected laterally on both sides both by the blade 37 and by the arm 35. This prevents the leaves and top from possibly wedging between the cutter and the drum and preventing the proper operation of these members. This leaves the beet still in the ground clear of its leaves and ready to be uprooted by the digging mechanism. In this case we have shown such mechanism as comprising a pair of rearwardly and upwardly diverging digging plates 41 of suitable character which follow close behind the topping mechanism and which are supported to form a rigid unit by arms 42 depending from the rear end of the frame 10. The particular form of digger or uprooter, however, forms no part of our present invention, which is confined solely to the topping mechanism. The setting of the digger relative to the ground and to the cutters may be altered by the rack mechanism. Such alteration of course alters the setting of the frame 15 but the movement of the latter can then be easily counteracted if necessary by manipulation of the levers 20 and 32.

After any beet has thus been topped the drum successively engages the other beets in the row one by one. If any beet should be higher from the ground than a preceding one the drum will lift the necessary distance so as to climb the beet, since the springs 18 are always capable of compressing the necessary extent without manipulating the lever 20 and without the entire machine being lifted. If a beet is lower than a preceding one the springs act to instantly lower the frame 15 and the drum after a high beet has been passed so that the lowering action of this frame takes place very quickly and there is no danger of said drum not returning to a necessary low position in time for the cutters to properly act on such lower beet.

When it is desired to transport the machine the rack pinions are turned so that the frames 10 and 15 are both raised the necessary distance to cause the overhanging members to properly clear the ground.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A beet topper including a structure to move along the ground, a revoluble drum mounted in connection with the structure to climb onto and ride over the top of a beet, said drum comprising a pair of transversely spaced members, a transverse cutter mounted in fixed connection with the drum a certain distance below the same and extending rearwardly from the vertical center line of the drum, a vertical cutter extending upwardly from the transverse cutter and projecting into the space between the drum members, and a vertical arm behind the drum disposed in transverse alinement with said space and supporting the cutter, the vertical blade extending rearwardly to said arm.

2. A beet topper including a structure to move along the ground, a revoluble drum mounted in connection with the structure to climb onto and ride over the top of a beet, a transverse cutter mounted in connection with the drum below the bottom of the same to engage and cut through the beet when the drum has climbed the beet, a frame supported by said structure and on which the cutter is fixed, a shaft for the drum, disc members in which said shaft is eccentrically journaled, bearing boxes for said discs on the frame, and means for rotating said discs in the frame whereby to alter the setting of the level of the drum relative to the cutter.

3. A beet topper including a structure to move along the ground, a topping mechanism supported from said structure and including a revoluble drum, and a transverse cutter mounted thereunder, rotatable members in which said drum is eccentrically journaled, and means for rotating said members.

In testimony whereof we affix our signatures.

CHARLES N. WOOD.
WILLIAM E. WOOD.